US012425791B2

(12) United States Patent
Krueger et al.

(10) Patent No.: US 12,425,791 B2
(45) **Date of Patent: *Sep. 23, 2025**

(54) METHOD AND APPARATUS FOR COMPRESSING AND DECOMPRESSING A HIGHER ORDER AMBISONICS REPRESENTATION FOR A SOUND FIELD

(71) Applicant: DOLBY LABORATORIES LICENSING CORPORATION, San Francisco, CA (US)

(72) Inventors: Alexander Krueger, Burgdorf (DE); Sven Kordon, Wunstorf (DE); Johannes Boehm, Göttingen (DE)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 18/068,096

(22) Filed: Dec. 19, 2022

(65) Prior Publication Data

US 2023/0179940 A1 Jun. 8, 2023

Related U.S. Application Data

(60) Continuation of application No. 17/532,246, filed on Nov. 22, 2021, now Pat. No. 11,546,712, which is a (Continued)

(30) Foreign Application Priority Data

Dec. 12, 2012 (EP) .................................... 12306569

(51) Int. Cl.

| | |
|---|---|
| ***H04S 7/00*** | (2006.01) |
| ***G10L 19/008*** | (2013.01) |
| ***H04S 3/00*** | (2006.01) |

(52) U.S. Cl.

CPC ............ *H04S 7/302* (2013.01); *G10L 19/008* (2013.01); *H04S 3/008* (2013.01); *H04S 2400/01* (2013.01); *H04S 2420/11* (2013.01)

(58) Field of Classification Search

CPC ...... H04S 7/302; H04S 3/008; H04S 2400/01; H04S 2420/11; G10L 19/008

See application file for complete search history.

(56) References Cited

U.S. PATENT DOCUMENTS

| | | | |
|---|---|---|---|
| 6,678,647 | B1 | 1/2004 | Edler et al. |
| 8,009,966 | B2 | 8/2011 | Bloom |

(Continued)

FOREIGN PATENT DOCUMENTS

| | | |
|---|---|---|
| CN | 101606192 | 12/2009 |
| CN | 101647059 B | 2/2010 |

(Continued)

OTHER PUBLICATIONS

Burnett, I. et al "Encoding Higher Order Ambisonics with AAC" AES Convention Paper 7366, presented at the 124th Convention, May 17-20, 2008, Amsterdam, The Netherlands, p. 1-8.

(Continued)

*Primary Examiner* — Andrew Sniezek

(57) ABSTRACT

The invention improves HOA sound field representation compression and decompression. A decoder decodes compressed dominant directional signals and compressed residual component signals so as to provide decompressed dominant directional signals and decompressed time domain signals representing a residual HOA component in a spatial domain. A re-correlator re-correlates the decompressed time domain signals to obtain a corresponding reduced-order residual HOA component. A processor determines a decompressed residual HOA component based on the corresponding reduced-order residual HOA component, and determines predicted directional signals based on at least a parameter.

(Continued)

The processor is further configured to determine an HOA sound field representation based on the decompressed dominant directional signals, the predicted directional signals, and the decompressed residual HOA component.

3 Claims, 5 Drawing Sheets

Related U.S. Application Data continuation of application No. 16/828,961, filed on Mar. 25, 2020, now Pat. No. 11,184,730, which is a division of application No. 16/276,363, filed on Feb. 14, 2019, now Pat. No. 10,609,501, which is a division of application No. 16/019,256, filed on Jun. 26, 2018, now Pat. No. 10,257,635, which is a division of application No. 15/435,175, filed on Feb. 16, 2017, now Pat. No. 10,038,965, which is a continuation of application No. 14/651,313, filed as application No. PCT/EP2013/075559 on Dec. 4, 2013, now Pat. No. 9,646,618.

(56) References Cited

U.S. PATENT DOCUMENTS

| | | | | |
|---|---|---|---|---|
| 8,705,750 | B2 | 4/2014 | Berge | |
| 9,190,065 | B2 | 11/2015 | Sen | |
| 9,646,618 | B2 | 5/2017 | Alexander | |
| 10,038,965 | B2 | 7/2018 | Krueger | |
| 10,257,635 | B2 | 4/2019 | Krueger | |
| 10,609,501 | B2 | 3/2020 | Krueger | |
| 11,184,730 | B2 | 11/2021 | Krueger | |
| 11,546,712 | B2 * | 1/2023 | Krueger | H04S 7/302 |
| 2010/0198601 | A1 | 8/2010 | Mouhssine et al. | |
| 2010/0329466 | A1 | 12/2010 | Berge | |
| 2012/0155653 | A1 | 6/2012 | Jax et al. | |
| 2014/0016784 | A1 * | 1/2014 | Sen | G10L 19/18 381/17 |
| 2014/0358565 | A1 | 12/2014 | Peters et al. | |
| 2015/0098572 | A1 | 4/2015 | Batke et al. | |
| 2015/0332679 | A1 | 11/2015 | Kruger | |
| 2015/0373471 | A1 | 12/2015 | Krueger | |
| 2016/0088415 | A1 | 3/2016 | Krueger et al. | |

FOREIGN PATENT DOCUMENTS

| | | | |
|---|---|---|---|
| CN | 101977349 | | 2/2011 |
| CN | 102163429 | | 8/2011 |
| EP | 1230586 | | 8/2002 |
| EP | 2305537 | | 6/2011 |
| EP | 2450880 | A1 | 5/2012 |
| EP | 2469742 | | 6/2012 |
| EP | 2665208 | | 11/2013 |
| JP | 2012-133366 | | 7/2012 |
| JP | 2013-545391 | A | 12/2013 |
| JP | 2015520411 | | 7/2015 |
| KR | 20120070521 | A | 6/2012 |
| KR | 102202973 | B1 | 1/2021 |
| RU | 2361288 | | 7/2009 |
| RU | 2450369 | | 5/2012 |
| TW | 200715145 | | 4/2007 |
| WO | 2002093556 | A1 | 11/2002 |
| WO | 2009046223 | | 4/2009 |
| WO | 2012/061148 | | 5/2012 |
| WO | 2014/012944 | | 1/2014 |
| WO | 2014/013070 | | 1/2014 |

OTHER PUBLICATIONS

Hellerud, E. et al "Encoding Higher Order Ambisonics with AAC" AES Convention Paper 7366, presented at the 124th Convention, May 17-20, 2008, Amsterdam, The Netherlands, p. 1-8.

Poletti, M.A. "Three-Dimensional Surround Sound Systems Based on Spherical Harmonics" J. Audio Engineering Society, vol. 53, No. 11, pp. 1004-2015, Nov. 2005.

Rafaely, Boaz "Plane-Wave Decomposition of the Sound Field on a Sphere by Spherical Convolution" J. Acoustic So. Am. 4 (116) pp. 2149-2159, Jul. 2004.

Trevino, J. et al "High Order Ambisonic Decoding Method for Irregular Loudspeaker Arrays" Proc. of 20th International Congress on Acoustics, ICA 2010, Aug. 23-27, 2010, Sydney, Australia.

Wabnitz, A. et al "Time Domain Reconstruction of Spatial Sound Fields Using Compressed Sensing" ICASSP May 2011, pp. 465-468.

Williams, Earl G. "Fourier Acoustics" vol. 93 of Applied Mathematical Sciences, Academic Press, 1999, Chapter 6, pp. 183-187.

* cited by examiner

METHOD AND APPARATUS FOR COMPRESSING AND DECOMPRESSING A HIGHER ORDER AMBISONICS REPRESENTATION FOR A SOUND FIELD

CROSS REFERENCE TO RELATED APPLICATIONS

This application is a continuation of U.S. patent application Ser. No. 17/532,246, filed Nov. 22, 2021, which is a continuation of U.S. patent application Ser. No. 16/828,961, filed Mar. 25, 2020, now U.S. Pat. No. 11,184,730, which is division of U.S. patent application Ser. No. 16/276,363, filed Feb. 14, 2019, now U.S. Pat. No. 10,609,501; which is division of U.S. patent application Ser. No. 16/019,256, filed Jun. 26, 2018, now U.S. Pat. No. 10,257,635, which is division of U.S. patent application Ser. No. 15/435,175, filed Feb. 16, 2017, now U.S. Pat. No. 10,038,965, which is continuation of U.S. patent application Ser. No. 14/651,313, filed Jun. 11, 2015, now U.S. Pat. No. 9,646,618, which is United States National Application of International Application No. PCT/EP2013/075559, filed Dec. 4, 2013, which claims priority to European Patent Application No. 12306569.0, filed Dec. 12, 2012, each of which is herein incorporated by reference in its entirety.

FIELD OF THE INVENTION

The invention relates to a method and to an apparatus for compressing and decompressing a Higher Order Ambisonics representation for a sound field.

BACKGROUND

Higher Order Ambisonics denoted HOA offers one way of representing three-dimensional sound. Other techniques are wave field synthesis (WFS) or channel based methods like 22.2. In contrast to channel based methods, the HOA representation offers the advantage of being independent of a specific loudspeaker set-up. This flexibility, however, is at the expense of a decoding process which is required for the playback of the HOA representation on a particular loudspeaker set-up. Compared to the WFS approach where the number of required loudspeakers is usually very large, HOA may also be rendered to set-ups consisting of only few loudspeakers. A further advantage of HOA is that the same representation can also be employed without any modification for binaural rendering to head-phones.

HOA is based on a representation of the spatial density of complex harmonic plane wave amplitudes by a truncated Spherical Harmonics (SH) expansion. Each expansion coefficient is a function of angular frequency, which can be equivalently represented by a time domain function. Hence, without loss of generality, the complete HOA sound field representation actually can be assumed to consist of O time domain functions, where O denotes the number of expansion coefficients. These time domain functions will be equivalently referred to as HOA coefficient sequences in the following.

The spatial resolution of the HOA representation improves with a growing maximum order N of the expansion. Unfortunately, the number of expansion coefficients O grows quadratically with the order N, in particular $O=(N+1)^2$. For example, typical HOA representations using order N=4 require O=25 HOA (expansion) coefficients. According to the above considerations, the total bit rate for the transmission of HOA representation, given a desired single-channel sampling rate $f_S$ and the number of bits $N_b$ per sample, is determined by $O\cdot f_S\cdot N_b$. Transmitting an HOA representation of order N=4 with a sampling rate of $f_S$=48 kHz employing $N_b$=16 bits per sample will result in a bit rate of 19.2 MBits/s, which is very high for many practical applications, e.g. streaming. Therefore, compression of HOA representations is highly desirable.

Invention

The existing methods addressing the compression of HOA representations (with N>1) are quite rare. The most straight forward approach pursued by E. Hellerud, I. Burnett, A Solvang and U. P. Svensson, "Encoding Higher Order Ambisonics with AAC", 124th AES Convention, Amsterdam, 2008, is to perform direct encoding of individual HOA coefficient sequences employing Advanced Audio Coding (AAC), which is a perceptual coding algorithm. However, the inherent problem with this approach is the perceptual coding of signals which are never listened to. The reconstructed playback signals are usually obtained by a weighted sum of the HOA coefficient sequences, and there is a high probability for unmasking of perceptual coding noise when the decompressed HOA representation is rendered on a particular loudspeaker set-up. The major problem for perceptual coding noise unmasking is high cross correlations between the individual HOA coefficient sequences. Since the coding noise signals in the individual HOA coefficient sequences are usually uncorrelated with each other, there may occur a constructive superposition of the perceptual coding noise while at the same time the noise-free HOA coefficient sequences are cancelled at superposition. A further problem is that these cross correlations lead to a reduced efficiency of the perceptual coders.

In order to minimise the extent of both effects, it is proposed in EP 2469742 A2 to transform the HOA representation to an equivalent representation in the discrete spatial domain before perceptual coding. Formally, that discrete spatial domain is the time domain equivalent of the spatial density of complex harmonic plane wave amplitudes, sampled at some discrete directions. The discrete spatial domain is thus represented by O conventional time domain signals, which can be interpreted as general plane waves impinging from the sampling directions and would correspond to the loudspeaker signals, if the loudspeakers were positioned in exactly the same directions as those assumed for the spatial domain transform.

The transform to discrete spatial domain reduces the cross correlations between the individual spatial domain signals, but these cross correlations are not completely eliminated. An example for relatively high cross correlations is a directional signal whose direction falls in-between the adjacent directions covered by the spatial domain signals.

A main disadvantage of both approaches is that the number of perceptually coded signals is $(N+1)^2$, and the data rate for the compressed HOA representation grows quadratically with the Ambisonics order N.

To reduce the number of perceptually coded signals, patent publication EP 2665208 A1 proposes decomposing of the HOA representation into a given maximum number of dominant directional signals and a residual ambient component. The reduction of the number of the signals to be perceptually coded is achieved by reducing the order of the residual ambient component. The rationale behind this approach is to retain a high spatial resolution with respect to dominant directional signals while representing the residual with sufficient accuracy by a lower-order HOA representation.

This approach works quite well as long as the assumptions on the sound field are satisfied, i.e. that it consists of a small number of dominant directional signals (representing general plane wave functions encoded with the full order N) and a residual ambient component without any directivity. However, if following decomposition the residual ambient component is still containing some dominant directional components, the order reduction causes errors which are distinctly perceptible at rendering following decompression. Typical examples of HOA representations where the assumptions are violated are general plane waves encoded in an order lower than N. Such general plane waves of order lower than N can result from artistic creation in order to make sound sources appearing wider, and can also occur with the recording of HOA sound field representations by spherical microphones. In both examples the sound field is represented by a high number of highly correlated spatial domain signals (see also section Spatial resolution of Higher Order Ambisonics for an explanation).

A problem to be solved by the invention is to remove the disadvantages resulting from the processing described in patent publication EP 2665208 A1, thereby also avoiding the above described disadvantages of the other cited prior art. The invention improves the HOA sound field representation compression processing described in patent publication EP 2665208 A1. First, like in EP 2665208 A1, the HOA representation is analysed for the presence of dominant sound sources, of which the directions are estimated. With the knowledge of the dominant sound source directions, the HOA representation is decomposed into a number of dominant directional signals, representing general plane waves, and a residual component. However, instead of immediately reducing the order of this residual HOA component, it is transformed into the discrete spatial domain in order to obtain the general plane wave functions at uniform sampling directions representing the residual HOA component. Thereafter these plane wave functions are predicted from the dominant directional signals. The reason for this operation is that parts of the residual HOA component may be highly correlated with the dominant directional signals.

That prediction can be a simple one so as to produce only a small amount of side information. In the simplest case the prediction consists of an appropriate scaling and delay. Finally, the prediction error is transformed back to the HOA domain and is regarded as the residual ambient HOA component for which an order reduction is performed.

Advantageously, the effect of subtracting the predictable signals from the residual HOA component is to reduce its total power as well as the remaining amount of dominant directional signals and, in this way, to reduce the decomposition error resulting from the order reduction.

In principle, the inventive compression method is suited for compressing a Higher Order Ambisonics representation denoted HOA for a sound field, said method including the steps:

- from a current time frame of HOA coefficients, estimating dominant sound source directions;
- depending on said HOA coefficients and on said dominant sound source directions, decomposing said HOA representation into dominant directional signals in time domain and a residual HOA component, wherein said residual HOA component is transformed into the discrete spatial domain in order to obtain plane wave functions at uniform sampling directions representing said residual HOA component, and wherein said plane wave functions are predicted from said dominant directional signals, thereby providing parameters describing said prediction, and the corresponding prediction error is transformed back into the HOA domain;
- reducing the current order of said residual HOA component to a lower order, resulting in a reduced-order residual HOA component;
- de-correlating said reduced-order residual HOA component to obtain corresponding residual HOA component time domain signals;
- perceptually encoding said dominant directional signals and said residual HOA component time domain signals so as to provide compressed dominant directional signals and compressed residual component signals.

In principle the inventive compression apparatus is suited for compressing a Higher Order Ambisonics representation denoted HOA for a sound field, said apparatus including:

- means being adapted for estimating dominant sound source directions from a current time frame of HOA coefficients;
- means being adapted for decomposing, depending on said HOA coefficients and on said dominant sound source directions, said HOA representation into dominant directional signals in time domain and a residual HOA component, wherein said residual HOA component is transformed into the discrete spatial domain in order to obtain plane wave functions at uniform sampling directions representing said residual HOA component, and wherein said plane wave functions are predicted from said dominant directional signals, thereby providing parameters describing said prediction, and the corresponding prediction error is transformed back into the HOA domain;
- means being adapted for reducing the current order of said residual HOA component to a lower order, resulting in a reduced-order residual HOA component;
- means being adapted for de-correlating said reduced-order residual HOA component to obtain corresponding residual HOA component time domain signals;
- means being adapted for perceptually encoding said dominant directional signals and said residual HOA component time domain signals so as to provide compressed dominant directional signals and compressed residual component signals.

In principle, the inventive decompression method is suited for decompressing a Higher Order Ambisonics representation compressed according to the above compression method, said decompressing method including the steps:

- perceptually decoding said compressed dominant directional signals and said compressed residual component signals so as to provide decompressed dominant directional signals and decompressed time domain signals representing the residual HOA component in the spatial domain;
- re-correlating said decompressed time domain signals to obtain a corresponding reduced-order residual HOA component;
- extending the order of said reduced-order residual HOA component to the original order so as to provide a corresponding decompressed residual HOA component;
- using said decompressed dominant directional signals, said original order decompressed residual HOA component, said estimated dominant sound source directions, and said parameters describing said prediction, composing a corresponding decompressed and recomposed frame of HOA coefficients.

In principle the inventive decompression apparatus is suited for decompressing a Higher Order Ambisonics representation compressed according to the above compressing method, said decompression apparatus including:

means being adapted for perceptually decoding said compressed dominant directional signals and said compressed residual component signals so as to provide decompressed dominant directional signals and decompressed time domain signals representing the residual HOA component in the spatial domain;

means being adapted for re-correlating said decompressed time domain signals to obtain a corresponding reduced-order residual HOA component;

means being adapted for extending the order of said reduced-order residual HOA component to the original order so as to provide a corresponding decompressed residual HOA component;

means being adapted for composing a corresponding decompressed and recomposed frame of HOA coefficients by using said decompressed dominant directional signals, said original order decompressed residual HOA component, said estimated dominant sound source directions, and said parameters describing said prediction.

BRIEF DESCRIPTION OF THE DRAWINGS

Exemplary embodiments of the invention are described with reference to the accompanying drawings, which show in.

EXEMPLARY EMBODIMENTS

Compression Processing

Figure 1A:
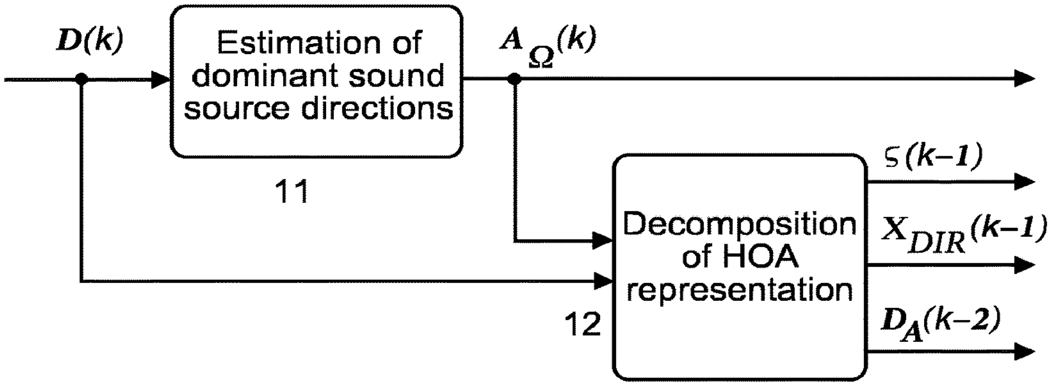
FIG. 1A illustrates an exemplary compression method, including decomposition of HOA signal into a number of dominant directional signals, a residual ambient HOA component and side information.
Figure 1B:
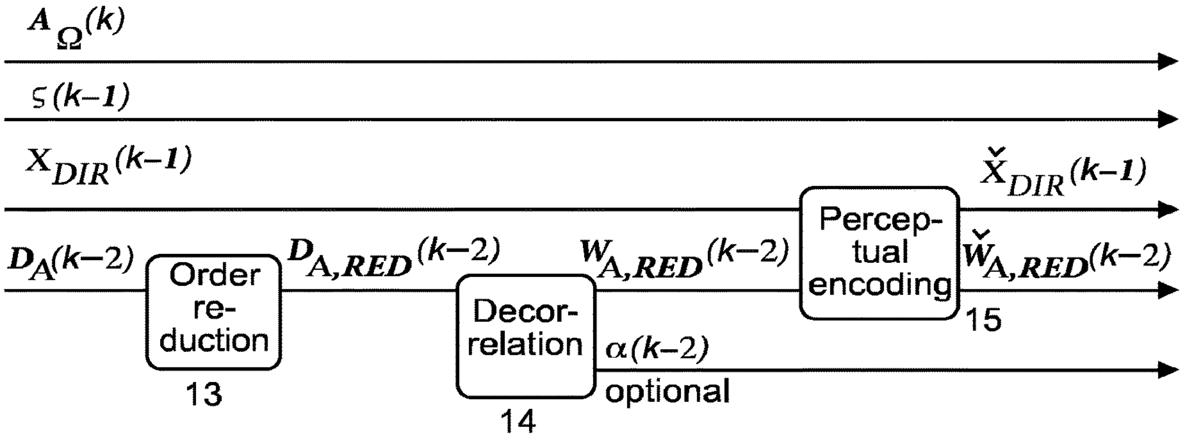
FIG. 1B illustrates an exemplary compression method, including order reduction and decorrelation for ambient HOA component and perceptual encoding of both components.

The compression processing according to the invention includes two successive steps illustrated in FIG. 1A and FIG. 1B, respectively. The exact definitions of the individual signals are described in section Detailed description of HOA decomposition and recomposition. A frame-wise processing for the compression with non-overlapping input frames D(k) of HOA coefficient sequences of length B is used, where k denotes the frame index. The frames are defined with respect to the HOA coefficient sequences specified in equation (42) as $$D(k):=[d((kB+1)T_S)\ d((kB+2)T_S)\ \dots\ d((kB+B)T_S)], \tag{1}$$

where $T_S$ denotes the sampling period.

In FIG. 1A, a frame D(k) of HOA coefficient sequences is input to a dominant sound source directions estimation step or stage 11, which analyses the HOA representation for the presence of dominant directional signals, of which the directions are estimated. The direction estimation can be performed e.g. by the processing described in patent publication EP 2665208 A1. The estimated directions are denoted by $\hat{\Omega}_{DOM,1}(k), \dots, \hat{\Omega}_{DOM,\mathcal{D}}(k)$, where $\mathcal{D}$ denotes the maximum number of direction estimates. They are assumed to be arranged in a matrix $A_{\hat{\Omega}}(k)$ as $$A_{\hat{\Omega}}(k):=[\hat{\Omega}_{DOM,1}(k), \dots, \hat{\Omega}_{DOM,\mathcal{D}}(k)] \tag{2}$$

It is implicitly assumed that the direction estimates are appropriately ordered by assigning them to the direction estimates from previous frames. Hence, the temporal sequence of an individual direction estimate is assumed to describe the directional trajectory of a dominant sound source. In particular, if the d-th dominant sound source is supposed not to be active, it is possible to indicate this by assigning a non-valid value to $\hat{\Omega}_{DOM,d}(k)$. Then, exploiting the estimated directions in $A_{\hat{\Omega}}(k)$, the HOA representation is decomposed in a decomposing step or stage 12 into a number of maximum $\mathcal{D}$ dominant directional signals $X_{DIR}(k-1)$, some parameters $\zeta(k-1)$ describing the prediction of the spatial domain signals of the residual HOA component from the dominant directional signals, and an ambient HOA component $D_A(k-2)$ representing the prediction error. A detailed description of this decomposition is provided in section HOA decomposition.

In FIG. 1B the perceptual coding of the directional signals $X_{DIR}(k-1)$ and of the residual ambient HOA component $D_A(k-2)$, is shown. The directional signals $X_{DIR}(k-1)$ are conventional time domain signals which can be individually compressed using any existing perceptual compression technique. The compression of the ambient HOA domain component $D_A(k-2)$ is carried out in two successive steps or stages. In an order reduction step or stage 13 the reduction to Ambisonics order $N_{RED}$ is carried out, where e.g. $N_{RED}=1$, resulting in the ambient HOA component $D_{A,RED}(k-2)$. Such order reduction is accomplished by keeping in $D_A(k-2)$ only $(N_{RED}+1)^2$ HOA coefficients and dropping the other ones. At decoder side, as explained below, for the omitted values corresponding zero values are appended.

It is noted that, compared to the approach in patent publication EP 2665208 A1, the reduced order $N_{RED}$ may in general be chosen smaller, since the total power as well as the remaining amount of directivity of the residual ambient HOA component is smaller. Therefore the order reduction causes smaller errors as compared to EP 2665208 A1.

In a following decorrelation step or stage 14, the HOA coefficient sequences representing the order reduced ambient HOA component $D_{A,RED}(k-2)$ are decorrelated to obtain the time domain signals $W_{A,RED}(k-2)$, which are input to (a bank of) parallel perceptual encoders or compressors 15 operating by any known perceptual compression technique. The decorrelation is performed in order to avoid perceptual coding noise unmasking when rendering the HOA representation following its decompression (see patent publication EP 2688065 A1 for explanation). An approximate decorrelation can be achieved by transforming $D_{A,RED}(k-2)$ to $O_{RED}$ equivalent signals in the spatial domain by applying a Spherical Harmonic Transform as described in EP 2469742 A2.

Alternatively, an adaptive Spherical Harmonic Transform as proposed in patent publication EP 2688066 A1 can be used, where the grid of sampling directions is rotated to achieve the best possible decorrelation effect. A further alternative decorrelation technique is the Karhunen-Loève transform (KLT) described in patent application EP 12305860.4. It is noted that for the last two types of de-correlation some kind of side information, denoted by $\alpha(k-2)$, is to be provided in order to enable reversion of the decorrelation at a HOA decompression stage.

In one embodiment, the perceptual compression of all time domain signals $X_{DIR}(k-1)$ and $W_{A,RED}(k-2)$ is performed jointly in order to improve the coding efficiency.

Output of the perceptual coding is the compressed directional signals $\check{X}_{DIR}(k-1)$ and the compressed ambient time domain signals $\check{W}_{A,RED}(k-2)$.

Decompression Processing

Figure 2A:
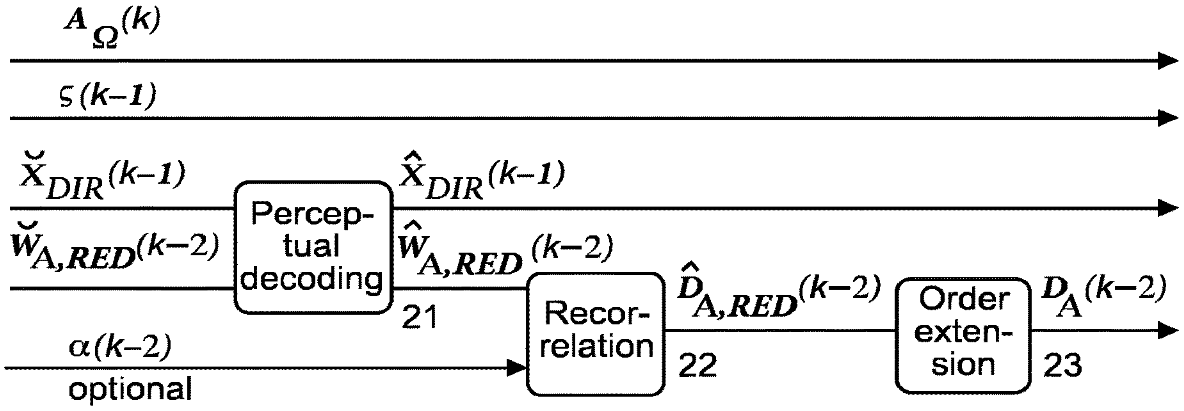
FIG. 2A illustrates an exemplary decompression method, including perceptual decoding of time domain signals, re-correlation of signals representing the residual ambient HOA component and order extension.
Figure 2B:
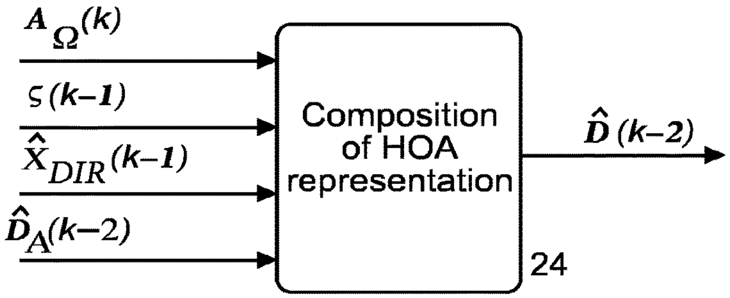
FIG. 2B illustrates an exemplary decompression method, including composition of total HOA representation.

The decompression processing is shown in FIG. 2A and FIG. 2B. Like the compression, it consists of two successive steps. In FIG. 2A a perceptual decompression of the directional signals $\check{X}_{DIR}(k-1)$ and the time domain signals $\check{W}_{A,RED}(k-2)$ representing the residual ambient HOA component is performed in a perceptual decoding or decompressing step or stage 21. The resulting perceptually decompressed time domain signals $\hat{W}_{A,RED}$ (k−2) are re-correlated in a re-correlation step or stage 22 in order to provide the residual component HOA representation $\hat{D}_{A,RED}$ (k−2) of order $N_{RED}$. Optionally, the re-correlation can be carried out in a reverse manner as described for the two alternative processings described for step/stage 14, using the transmitted or stored parameters $\alpha(k-2)$ depending on the decorrelation method that was used. Thereafter, from $\hat{D}_{A,RED}$ (k−2) an appropriate HOA representation $\hat{D}_A(k-2)$ of order N is estimated in order extension step or stage 23 by order extension. The order extension is achieved by appending corresponding 'zero' value rows to $\hat{D}_{A,RED}$ (k−2), thereby assuming that the HOA coefficients with respect to the higher orders have zero values.

In FIG. 2B, the total HOA representation is re-composed in a composition step or stage 24 from the decompressed dominant directional signals $\hat{X}_{DIR}(k-1)$ together with the tion D(k−2) and the HOA representation $D_{DIR}(k-1)$ of the dominant directional signals together with the HOA representation $\hat{D}_{GRID,DIR}(k-2)$ of the predicted directional signals from uniformly distributed directions is computed and output.

Before going into detail, it is mentioned that the changes of the directions between successive frames can lead to a discontinuity of all computed signals during the composition. Hence, instantaneous estimates of the respective signals for overlapping frames are computed first, which have a length of 2 B. Second, the results of successive overlapping frames are smoothed using an appropriate window function. Each smoothing, however, introduces a latency of a single frame.

Computing Instantaneous Dominant Directional Signals

The computation of the instantaneous dominant direction signals in step or stage 30 from the estimated sound source directions in $A_{\hat{\Omega}}(k)$ for a current frame D (k) of HOA coefficient sequences is based on mode matching as described in M. A. Poletti, "Three-Dimensional Surround Sound Systems Based on Spherical Harmonics", *J. Audio Eng. Soc.*, 53(11), pages 1004-1025, 2005. In particular, those directional signals are searched whose HOA representation results in the best approximation of the given HOA signal.

Further, without loss of generality, it is assumed that each direction estimate $\hat{\Omega}_{DOM,d}(k)$ of an active dominant sound source can be unambiguously specified by a vector containing an inclination angle $\theta_{DOM,d}(k)\in[0,\pi]$ and an azimuth angle $\phi_{DOM,d}(k)\in[0,2\pi]$ (see FIG. 5 for illustration) according to $$\hat{\Omega}_{DOM,d}(k):=(\hat{\theta}_{DON,d}(k),\hat{\phi}_{DOM,d}(k))^T. \tag{3}$$

First, the mode matrix based on the direction estimates of active sound sources is computed according to $$\Xi_{ACT}(k) := \tag{4}$$

$$\left[S_{DOM,d_{ACT,1(k)}}(k)\ \ S_{DOM,d_{ACT,2(k)}}(k)\ \ \ldots\ \ S_{DOM,d_{ACT,D_{ACT}(k)}(k)}(k)\right] \in \mathbb{R}^{O\times D_{ACT}(k)} \tag{5}$$

$$\text{with } S_{DOM,d}(k) := \left[S_0^0(\hat{\Omega}_{DOM,d}(k)),\ S_1^{-1}(\hat{\Omega}_{DOM,d}(k)),\ S_1^0(\hat{\Omega}_{DOM,d}(k)),\ \ldots,\ S_N^N(\hat{\Omega}_{DOM,d}(k))\right]^T \in \mathbb{R}^O.$$

corresponding directions $A_{\hat{\Omega}}(k)$ and the prediction parameters $\zeta(k-1)$, as well as from the residual ambient HOA component $\hat{D}_A(k-2)$, resulting in decompressed and recomposed frame $\hat{D}(k-2)$ of HOA coefficients.

In case the perceptual compression of all time domain signals $X_{DIR}(k-1)$ and $W_{A,RED}$ (k−2) was performed jointly in order to improve the coding efficiency, the perceptual decompression of the compressed directional signals $\check{X}_{DIR}$ (k−1) and the compressed time domain signals $\check{W}_{A,RED}$ (k−2) is also performed jointly in a corresponding manner.

A detailed description of the recomposition is provided in section HOA recomposition.

HOA Decomposition

Figure 3:
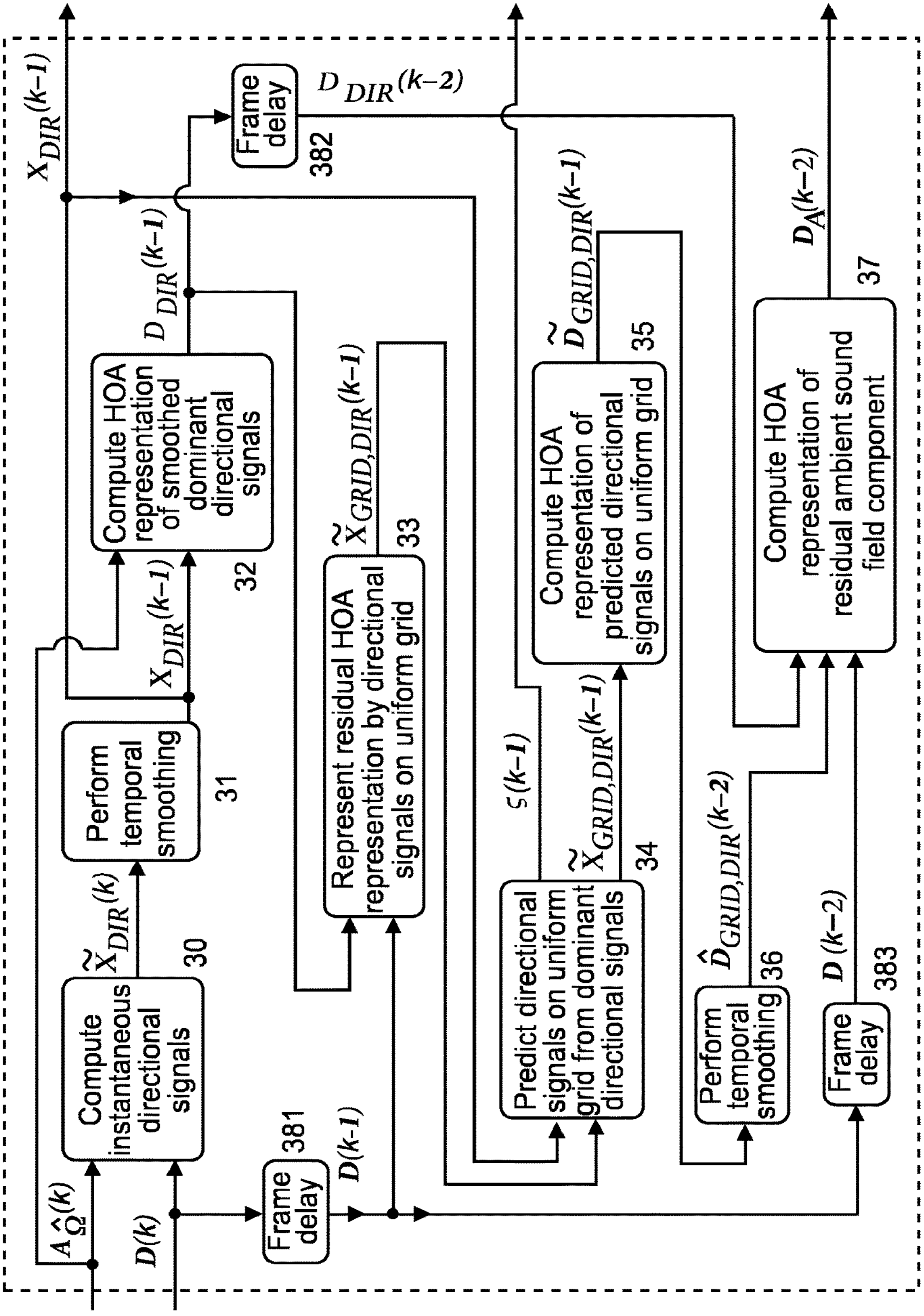
FIG. 3 illustrates an exemplary HOA decomposition.

A block diagram illustrating the operations performed for the HOA decomposition is given in FIG. 3. The operation is summarised: First, the smoothed dominant directional signals $X_{DIR}(k-1)$ are computed and output for perceptual compression. Next, the residual between the HOA representation $D_{DIR}$ (k−1) of the dominant directional signals and the original HOA representation D(k−1) is represented by a number of O directional signals $\tilde{X}_{GRID,DIR}$ (k−1), which can be thought of as general plane waves from uniformly distributed directions. These directional signals are predicted from the dominant directional signals $X_{DIR}(k-1)$, where the prediction parameters $\zeta(k-1)$ are output. Finally, the residual $D_A(k-2)$ between the original HOA representa- In equation (4), $D_{ACT}(k)$ denotes the number of active directions for the k-th frame and $d_{ACT,j}(k)$, $1\le j\le D_{ACT}(k)$ indicates their indices. $S_n^m(\cdot)$ denotes the real-valued Spherical Harmonics, which are defined in section Definition of real valued Spherical Harmonics.

Second, the matrix $\tilde{X}_{DIR}(k-1)\in\mathbb{R}^{\mathcal{D}\times 2B}$ containing the instantaneous estimates of all dominant directional signals for the (k−1)-th and k-th frames defined as $$\tilde{X}_{DIR}(k):[\tilde{x}_{DIR}(k,1)\ \tilde{x}_{DIR}(k,2)\ \ldots\ \tilde{x}_{DIR}(k,2B)] \tag{6}$$

$$\text{with } \tilde{x}_{DIR}(k,l):=[\tilde{x}_{DIR,1}(k,l),\tilde{x}_{DIR,2}(k,l),\ \ldots,\ \tilde{x}_{DIR,\mathcal{D}}(k,l)]^T\in\mathbb{R}^{\mathcal{D}},1\le l\le 2B \tag{7}$$

is computed. This is accomplished in two steps. In the first step, the directional signal samples in the rows corresponding to inactive directions are set to zero, i.e.

$$\tilde{x}_{DIR,d}(k,l)=0\ \forall 1\le l\le 2B,\text{ if } d\notin\mathcal{M}_{ACT}(k), \tag{8}$$

where $\mathcal{M}_{ACT}$ (k) indicates the set of active directions. In the second step, the directional signal samples corresponding to active directions are obtained by first arranging them in a matrix according to $$\tilde{X}_{DIR,ACT}(k) := \begin{bmatrix} \tilde{x}_{DIR,d_{ACT,1}(k)}(k,1) & \cdots & \tilde{x}_{DIR,d_{ACT,1}(k)}(k,2B) \\ \vdots & \ddots & \vdots \\ \tilde{x}_{DIR,d_{ACT,D_{ACT}(k)}(k)}(k,1) & \ldots & \tilde{x}_{DIR,d_{ACT,D_{ACT}(k)}(k)}(k,2B) \end{bmatrix}. \quad (9)$$

This matrix is then computed to minimise the Euclidean norm of the error $$\Xi_{ACT}(k)\tilde{X}_{DIR,ACT}(k)-[D(k-1)D(k)]. \quad (10)$$

The solution is given by $$\tilde{X}_{DIR,ACT}(k)=[\Xi_{ACT}^{T}(k)\Xi_{ACT}(k)]^{-1}\Xi^{T}{}_{ACT}{}^{T}(k)[D(k-1)\ D(k)]. \quad (11)$$

The smoothed dominant directional signals $x_{DIR,d}$ (l) are supposed to be continuous signals, which are successively input to perceptual coders.

Computing HOA Representation of Smoothed Dominant Directional Signals

From $X_{DIR}$(k−1) and $A_{\hat{\Omega}}$(k), the HOA representation of the smoothed dominant directional signals is computed in step or stage 32 depending on the continuous signals $x_{DIR,d}$ (l) in order to mimic the same operations like to be performed for the HOA composition. Because the changes of the direction estimates between successive frames can lead to a discontinuity, once again instantaneous HOA representations of overlapping frames of length 2 B are computed and the results of successive overlapping frames are smoothed by using an appropriate window function. Hence, the HOA representation $D_{DIR}$(k−1) is obtained by $$D_{DIR}(k-1) = \Xi_{ACT}(k)X_{DIR,ACT,WIN1}(k-1) + \Xi_{ACT}(k-1)X_{DIR,ACT,WIN2}(k-1), \quad (18)$$

$$\text{where } X_{DIR,ACT,WIN1}(k-1) := \begin{bmatrix} x_{DIR,d_{ACT,1}(k)}((k-1)B+1)\cdot w(1) & \ldots & x_{DIR,d_{ACT,1}(k)}(kB)\cdot w(B) \\ x_{DIR,d_{ACT,2}(k)}((k-1)B+1)\cdot w(1) & & x_{DIR,d_{ACT,2}(k)}(kB)\cdot w(B) \\ \vdots & \ddots & \vdots \\ x_{DIR,d_{ACT,D_{ACT}(k)}(k)}((k-1)B+1)\cdot w(1) & \ldots & x_{DIR,d_{ACT,D_{ACT}(k)}(k)}(kB)\cdot w(B) \end{bmatrix} \quad (19)$$

$$\text{and } X_{DIR,ACT,WIN2}(k-1) := \begin{bmatrix} x_{DIR,d_{ACT,1}(k-1)}((k-1)B+1)\cdot w(B+1) & \ldots & x_{DIR,d_{ACT,1}(k-1)}(kB)\cdot w(2B) \\ x_{DIR,d_{ACT,2}(k-1)}((k-1)B+1)\cdot w(B+1) & & x_{DIR,d_{ACT,2}(k-1)}(kB)\cdot w(2B) \\ \vdots & \ddots & \vdots \\ x_{DIR,d_{ACT,D_{ACT}(k-1)}(k-1)}((k-1)B+1)\cdot w(B+1) & \ldots & x_{DIR,d_{ACT,D_{ACT}(k-1)}(k-1)}(kB)\cdot w(2B) \end{bmatrix}. \quad (20)$$

Temporal Smoothing

For step or stage 31, the smoothing is explained only for the directional signals $\tilde{X}_{DIR}$(k), because the smoothing of other types of signals can be accomplished in a completely analogous way. The estimates of the directional signals $\tilde{x}_{DIR,d}$(k,l), $1 \le d \le \mathcal{D}$, whose samples are contained in the matrix $\tilde{X}_{DIR}$(k) according to equation (6), are windowed by an appropriate window function w(l):

$$\tilde{x}_{DIR,WIN,d}(k,l):=\tilde{x}_{DIR,d}(k,l)\cdot w(l), 1\le l\le 2B. \quad (12)$$

This window function must satisfy the condition that it sums up to '1' with its shifted version (assuming a shift of B samples) in the overlap area:

$$w(l)+w(B+l)=1 \ \forall 1\le l\le B. \quad (13)$$

An example for such window function is given by the periodic Hann window defined by $$w(l) := 0.5\left[1-\cos\left(\frac{2\pi(l-1)}{2B}\right)\right] \text{for } 1 \le l \le 2B. \quad (14)$$

The smoothed directional signals for the (k−1)-th frame are computed by the appropriate superposition of windowed instantaneous estimates according to $$x_{DIR,d}((k-1)B+l)=\tilde{x}_{DIR,WIN,d}(k-1,B+l)+\tilde{x}_{DIR,WIN,d}(k,l) \quad (15)$$

The samples of all smoothed directional signals for the (k−1)-th frame are arranged in the matrix $X_{DIR}$(k−1):=

$$[x_{DIR}((k-1)B+1)x_{DIR}((k-1)B+2) \ldots x_{DIR}((k-1)B+B)]\in \mathbb{R}^{\mathcal{D}\times B} \quad (16)$$

$$\text{with } x_{DIR}(l)=[x_{DIR,1}(l),x_{DIR,2}(l), \ldots ,x_{DIR,\mathcal{D}}(l)]^{T}\in \mathbb{R}^{\mathcal{D}}. \quad (17)$$

Representing Residual HOA Representation by Directional Signals on Uniform Grid

From $D_{DIR}$(k−1) and D(k−1) (i.e. D(k) delayed by frame delay 381), a residual HOA representation by directional signals on a uniform grid is calculated in step or stage 33. The purpose of this operation is to obtain directional signals (i.e. general plane wave functions) impinging from some fixed, nearly uniformly distributed directions $\hat{\Omega}_{GRID,o}$, 1≤o≤O (also referred to as grid directions), to represent the residual [D(k−2) D(k−1)]−[$D_{DIR}$(k−2) $D_{DIR}$(k−1)].

First, with respect to the grid directions the mode matrix $\Xi_{GRID}$ is computed as $$\Xi_{GRID}=[S_{GRID,1}S_{GRID,2} \ldots S_{GRID,O}]\in \mathbb{R}^{O\times O} \quad (21)$$

with $$S_{GRID,o}:=[S_0^0(\hat{\Omega}_{GRID,o}),S_1^{-1}(\hat{\Omega}_{GRID,o}), S_1^0(\hat{\Omega}_{GRID,o}), \ldots ,S_N^N(\hat{\Omega}_{GRID,o})]^T\in \mathbb{R}^{O}. \quad (22)$$

Because the grid directions are fixed during the whole compression procedure, the mode matrix $\Xi_{GRID}$ needs to be computed only once.

The directional signals on the respective grid are obtained as $$\tilde{X}_{GRID,DIR}(k-1)=\Xi_{GRID}^{-1}([D(k-2)D(k-1)]-[D_{DIR}(k-2)D_{DIR}(k-1)]). \quad (23)$$

Predicting Directional Signals on Uniform Grid from Dominant Directional Signals From $\tilde{X}_{GRID,DIR}$(k−1) and $X_{DIR}$(k−1), directional signals on the uniform grid are predicted in step or stage 34. The prediction of the directional signals on the uniform grid composed of the grid directions $\hat{\Omega}_{GRID,o}$, 1≤o≤O from the directional signals is based on two successive frames for smoothing purposes, i.e. the extended frame of grid signals $\tilde{X}_{GRID,DIR}$(k−1) (of length 2 B) is predicted from the extended frame of smoothed dominant directional signals $$\tilde{X}_{DIR,EXT}(k-1):=[X_{DIR}(k-3)X_{DIR}(k-2)X_{DIR}(k-1)]. \quad (24)$$

First, each grid signal $\tilde{x}_{GRID,DIR,o}$ (k−1,l), 1≤o≤O, contained in $\tilde{X}_{GRID,DIR}$(k−1) is assigned to a dominant directional signal $\tilde{x}_{DIR,EXT,d}$ (k−1,l), 1≤d≤$\mathcal{D}$, contained in $\tilde{X}_{DIR,EXT}$(k−1). The assignment can be based on the computation of the normalised cross-correlation function between the grid signal and all dominant directional signals. In particular, that dominant directional signal is assigned to the grid signal, which provides the highest value of the normalised cross-correlation function. The result of the assignment can be formulated by an assignment function $f_{\mathcal{A},k-1}:\{1, \ldots, O\}\rightarrow\{1, \ldots, \mathcal{D}\}$ assigning the o-th grid signal to the $f_{\mathcal{A},k-1}(o)$-th dominant directional signal.

Second, each grid signal $\tilde{x}_{GRID,DIR,o}$ k−1,l) is predicted from the assigned dominant directional signal $\tilde{x}_{DIR,EXT,f_{\mathcal{A},k-1}(o)}$(k−1,l). The predicted grid signal $\hat{\tilde{x}}_{GRID,DIR,o}$(k−1,l) is computed by a delay and a scaling from the assigned dominant directional signal $\tilde{x}_{DIR,EXT,f_{\mathcal{A},k-1}(o)}$ (k−1,l) as $$\hat{\tilde{x}}_{GRID,DIR,o}(k-1,l)=K_o(k-1)\cdot\tilde{x}_{DIR,EXT,f_{\mathcal{A},k-1}(o)}(k-1,l-\Delta_o)(k-1)), \tag{25}$$

where $K_O$(k−1) denotes the scaling factor and $\Delta_o$(k−1) indicates the sample delay. These parameters are chosen for minimising the prediction error.

If the power of the prediction error is greater than that of the grid signal itself, the prediction is assumed to have failed. Then, the respective prediction parameters can be set to any non-valid value.

It is noted that also other types of prediction are possible. For example, instead of computing a full-band scaling factor, it is also reasonable to determine scaling factors for perceptually oriented frequency bands. However, this operation improves the prediction at the cost of an increased amount of side information.

Computing HOA Representation of Residual Ambient Sound Field Component

From $\hat{D}_{GRID,DIR}$(k−2), which is a temporally smoothed version (in step/stage 36) of $\hat{\hat{D}}_{GRID,DIR}$(k−1), from D(k−2) which is a two-frames delayed version (delays 381 and 383) of D(k), and from $D_{DIR}$(k−2) which is a frame delayed version (delay 382) of $D_{DIR}$(k−1), the HOA representation of the residual ambient sound field component is computed in step or stage 37 by $$D_A(k-2)=D(k-2)-\hat{D}_{GRID,DIR}(k-2)D_{DIR}(k-2) \tag{28}$$

HOA Recomposition

Figure 4:
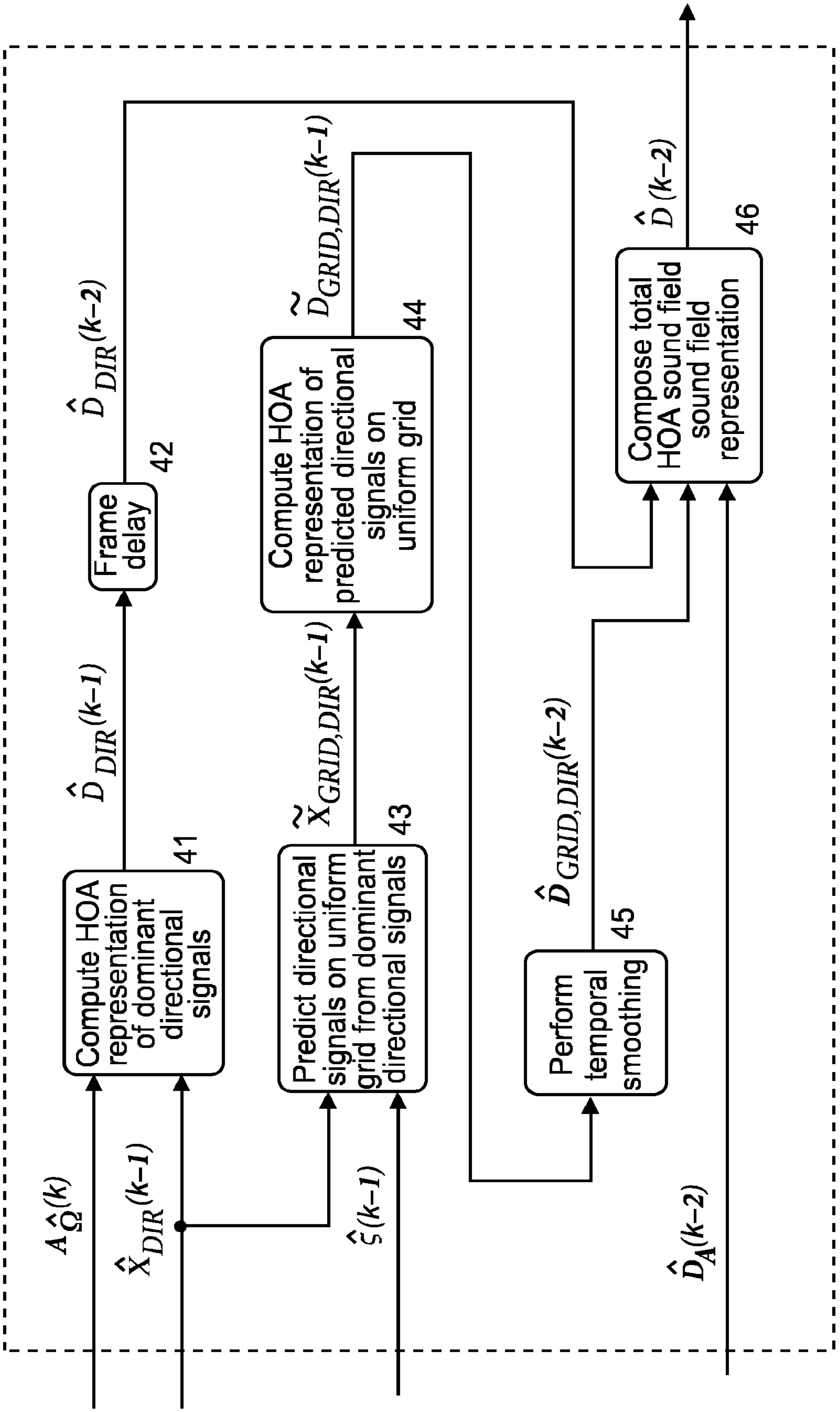
FIG. 4 illustrates an exemplary HOA composition.

Before describing in detail the processing of the individual steps or stages in FIG. 4 in detail, a summary is provided. The directional signals $\hat{\hat{X}}_{GRID,DIR}$(k−1) with respect to uniformly distributed directions are predicted from the decoded dominant directional signals $\hat{X}_{DIR}$(k−1) using the prediction parameters $\zeta$(k−1). Next, the total HOA representation $\hat{D}$(k−2) is composed from the HOA representation $\hat{D}_{DIR}$(k−2) of the dominant directional signals, the HOA representation $\hat{D}_{GRID,DIR}$(k−2) of the predicted directional signals and the residual ambient HOA component $\hat{D}_A$(k−2).

Computing HOA Representation of Dominant Directional Signals $A_{\hat{\Omega}}$(k) and $\hat{X}_{DIR}$(k−1) are input to a step or stage 41 for determining an HOA representation of dominant directional signals. After having computed the mode matrices $\Xi_{ACT}$ (k) and $\Xi_{ACT}$ (k−1) from the direction estimates $A_{\hat{\Omega}}$(k) and $A_{\hat{\Omega}}$(k−1), based on the direction estimates of active sound sources for the k-th and (k−1)-th frames, the HOA representation of the dominant directional signals $\hat{D}_{DIR}$(k−1) is obtained by $$\hat{D}_{DIR}(k-1) = \Xi_{ACT}(k)X_{DIR,ACT,WIN1}(k-1) + \Xi_{ACT}(k-1)X_{DIR,ACT,WIN2}(k-1), \tag{29}$$

$$\text{where } X_{DIR,ACT,WIN1}(k-1) := \begin{bmatrix} \hat{x}_{DIR,d_{ACT,1}(k)}((k-1)B+1)\cdot w(1) & \ldots & \hat{x}_{DIR,d_{ACT,1}(k)}(kB)\cdot w(B) \\ \hat{x}_{DIR,d_{ACT,2}(k)}((k-1)B+1)\cdot w(1) & & \hat{x}_{DIR,d_{ACT,2}(k)}(kB)\cdot w(B) \\ \vdots & \ddots & \vdots \\ \hat{x}_{DIR,d_{ACT,D_{ACT}(k)}(k)}((k-1)B+1)\cdot w(1) & \ldots & \hat{x}_{DIR,d_{ACT,D_{ACT}(k)}(k)}(kB)\cdot w(B) \end{bmatrix} \tag{30}$$

$$\text{and } X_{DIR,ACT,WIN2}(k-1) := \begin{bmatrix} \hat{x}_{DIR,d_{ACT,1}(k-1)}((k-1)B+1)\cdot w(B+1) & \ldots & \hat{x}_{DIR,d_{ACT,1}(k-1)}(kB)\cdot w(2B) \\ \hat{x}_{DIR,d_{ACT,2}(k-1)}((k-1)B+1)\cdot w(B+1) & & \hat{x}_{DIR,d_{ACT,2}(k-1)}(kB)\cdot w(2B) \\ \vdots & \ddots & \vdots \\ \hat{x}_{DIR,d_{ACT,D_{ACT}(k-1)}(k-1)}((k-1)B+1)\cdot w(B+1) & \ldots & \hat{x}_{DIR,d_{ACT,D_{ACT}(k-1)}(k-1)}(kB)\cdot w(2B) \end{bmatrix}. \tag{31}$$

All prediction parameters can be arranged in the parameter matrix as $$\zeta(k-1) := \begin{bmatrix} f_{\mathcal{A},k-1}(1) & K_1(k-1) & \Delta_1(k-1) \\ f_{\mathcal{A},k-1}(2) & K_2(k-1) & \Delta_2(k-1) \\ \vdots & \vdots & \vdots \\ f_{\mathcal{A},k-1}(O) & K_O(k-1) & \Delta_O(k-1) \end{bmatrix}. \tag{26}$$

All predicted signals $\hat{\tilde{x}}_{GRID,DIR,o}$(k−1,l), 1≤o≤O, are assumed to be arranged in the matrix $\hat{\tilde{X}}_{GRID,DIR}$(k−1).

Computing HOA Representation of Predicted Directional Signals on Uniform Grid

The HOA representation of the predicted grid signals is computed in step or stage 35 from $\hat{\tilde{X}}_{GRID,DIR}$(k−1) according to $$\hat{\tilde{D}}_{GRID,DIR}(k-1)=\Xi_{GRID}\hat{\tilde{X}}_{GRID,DIR}(k-1) \tag{27}$$

Predicting Directional Signals on Uniform Grid from Dominant Directional Signals $\hat{\zeta}$(k−1) and $\hat{X}_{DIR}$(k−1) are input to a step or stage 43 for predicting directional signals on uniform grid from dominant directional signals. The extended frame of predicted directional signals on uniform grid consists of the elements $\hat{\hat{x}}_{GRID,DIR,o}$(k−1,l) according to $$\hat{\hat{X}}_{GRID,DIR}(k-1) = \begin{bmatrix} \hat{\hat{x}}_{GRID,DIR,1}(k-1,1) & \ldots & \hat{\hat{x}}_{GRID,DIR,1}(k-1,2B) \\ \hat{\hat{x}}_{GRID,DIR,2}(k-1,1) & & \hat{\hat{x}}_{GRID,DIR,2}(k-1,2B) \\ \vdots & \ddots & \vdots \\ \hat{\hat{x}}_{GRID,DIR,O}(k-1,1) & \ldots & \hat{\hat{x}}_{GRID,DIR,O}(k-1,2B) \end{bmatrix}, \tag{32}$$

which are predicted from the dominant directional signals by $$\hat{\tilde{x}}_{GRID,DIR,o}(k-1,l)=K_o(k-1)\cdot\hat{x}_{DIR,f_{\mathcal{A},k-1}(o)}((k-1)B+l-\Delta_o(k-1)). \quad (33)$$

Computing HOA Representation of Predicted Directional Signals on Uniform Grid

In a step or stage 44 for computing the HOA representation of predicted directional signals on uniform grid, the HOA representation of the predicted grid directional signals is obtained by $$\hat{\tilde{D}}_{GRID,DIR}(k-1)=\Xi_{GRID}\hat{\tilde{X}}_{GRID,DIR}(k-1), \quad (34)$$

where $\Xi_{GRID}$ denotes the mode matrix with respect to the predefined grid directions (see equation (21) for definition).

Composing HOA Sound Field Representation

From $\hat{D}_{DIR}$(k−2) (i.e. $\hat{D}_{DIR}$(k−1) delayed by frame delay 42), $\hat{D}_{GRID,DIR}$(k−2) (which is a temporally smoothed version of $\hat{\tilde{D}}_{GRID,DIR}$(k−1) in step/stage 45) and $\hat{D}_A$(k−2), the total HOA sound field representation is finally composed in a step or stage 46 as $$\hat{D}(k-2)=\hat{D}_{DIR}(k-2)+\hat{D}_{GRID,DIRR}(k-2)+\hat{D}_A(k-2). \quad (35)$$

Basics of Higher Order Ambisonics

Figure 5:
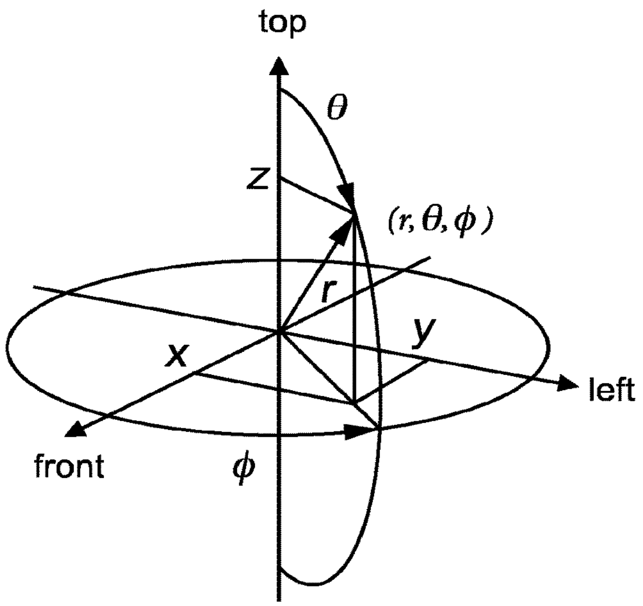
FIG. 5 illustrates an exemplary spherical coordinate system.

Higher Order Ambisonics is based on the description of a sound field within a compact area of interest, which is assumed to be free of sound sources. In that case the spatiotemporal behaviour of the sound pressure p(t,x) at time t and position x within the area of interest is physically fully determined by the homogeneous wave equation. The following is based on a spherical coordinate system as shown in FIG. 5. The x axis points to the frontal position, the y axis points to the left, and the z axis points to the top. A position in space $x=(r,\theta,\phi)^T$ is represented by a radius r>0 (i.e. the distance to the coordinate origin), an inclination angle θ∈[0, π] measured from the polar axis z and an azimuth angle ϕ∈[0,2π[measured counter-clockwise in the x-y plane from the x axis. $(\cdot)^T$ denotes the transposition.

It can be shown (see E. G. Williams, "Fourier Acoustics", volume 93 of Applied Mathematical Sciences, Academic Press, 1999) that the Fourier transform of the sound pressure with respect to time denoted by $\mathcal{F}_t(\cdot)$, i.e.

$$P(\omega,x)=\mathcal{F}_t(p(t,x))=\int_{-\infty}^{\infty}p(t,x)e^{-i\omega t}dt \quad (36)$$

with ω denoting the angular frequency and i denoting the imaginary unit, may be expanded into a series of Spherical Harmonics according to $$P(\omega=kc_s,r,\theta,\phi)=\sum_{n=0}^{N}\sum_{m=-n}^{n}A_n^m(k)j_n(kr)S_n^m(\theta,\phi), \quad (37)$$

where $c_s$ denotes the speed of sound and k denotes the angular wave number, which is related to the angular frequency ω by $$k=\frac{\omega}{c_s},$$

$j_n(\cdot)$ denotes the spherical Bessel functions of the first kind, and $S_n^m(\theta,\phi)$ denotes the real valued Spherical Harmonics of order n and degree m which are defined in section Definition of real valued Spherical Harmonics. The expansion coefficients $A_n^m(k)$ are depending only on the angular wave number k. Note that it has been implicitly assumed that sound pressure is spatially band-limited. Thus the series is truncated with respect to the order index n at an upper limit N, which is called the order of the HOA representation.

If the sound field is represented by a superposition of an infinite number of harmonic plane waves of different angular frequencies co and is arriving from all possible directions specified by the angle tuple (θ, ϕ), it can be shown (see B. Rafaely, "Plane-wave Decomposition of the Sound Field on a Sphere by Spherical Convolution", J. Acoust. Soc. Am., 4(116), pages 2149-2157, 2004) that the respective plane wave complex amplitude function D(ω,θ,ϕ) can be expressed by the Spherical Harmonics expansion $$D(\omega=kc_s,\theta,\phi)=\sum_{n=0}^{N}\sum_{m=-n}^{n}D_m^n(k)S_n^m(\theta,\phi), \quad (38)$$

where the expansion coefficients $D_n^m(k)$ are related to the expansion coefficients $A_n^m(k)$ by $$A_n^m(k)=4\pi i^n D_n^m(k). \quad (39)$$

Assuming the individual coefficients $D_n^m(k=\omega/c_s)$ to be functions of the angular frequency ω, the application of the inverse Fourier transform (denoted by $\mathcal{F}_t^{-1}(\cdot)$) provides time domain functions $$d_n^m(t)=\mathcal{F}_t^{-1}\left(D_n^m\left(\frac{\omega}{c_s}\right)\right)=\frac{1}{2\pi}\int_{-\infty}^{\infty}D_n^m\left(\frac{\omega}{c_s}\right)e^{i\omega t}d\omega \quad (40)$$

for each order n and degree m, which can be collected in a single vector d(t)=

$$\begin{bmatrix} d_0^0(t) & d_1^{-1}(t) & d_1^0(t) & d_1^1(t) & d_2^{-2}(t) & d_2^{-1}(t) & d_2^0(t) & d_2^1(t) & d_2^2(t) & \ldots \\ d_N^{N-1}(t) & d_N^N(t) \end{bmatrix}^T. \quad (41)$$

The position index of a time domain function $d_n^m(t)$ within the vector d(t) is given by n(n+1)+1+m.

The final Ambisonics format provides the sampled version of d(t) using a sampling frequency $f_S$ as $$\{d(lT_S)\}_{l\in\mathbb{N}}=\{d(T_S),d(2T_S),d(3T_S),d(4T_S),\ldots\}, \quad (42)$$

where $T_S=1/f_S$ denotes the sampling period. The elements of $d(lT_S)$ are referred to as Ambisonics coefficients. Note that the time domain signals $d_n^m(t)$ and hence the Ambisonics coefficients are real-valued.

Definition of Real-Valued Spherical Harmonics

The real valued spherical harmonics $S_n^m(\theta,\phi)$ are given by $$S_n^m(\theta,\phi)=\sqrt{\frac{(2n+1)}{4\pi}\frac{(n-|m|)!}{(n+|m|)!}}P_{n,|m|}(\cos\theta)trg_m(\phi) \quad (43)$$

$$\text{with } trg_m(\phi)=\begin{cases}\sqrt{2}\cos(m\phi) & m>0\\ 1 & m=0\\ -\sqrt{2}\sin(m\phi) & m<0\end{cases}. \quad (44)$$

The associated Legendre functions $P_{n,m}(x)$ are defined as $$P_{n,m}(x)=(1-x^2)^{m/2}\frac{d^m}{dx^m}P_n(x),\ m\geq 0 \quad (45)$$

with the Legendre polynomial $P_n(x)$ and, unlike in the above mentioned E. G. Williams textbook, without the Condon-Short-ley phase term $(-1)^m$.

Spatial Resolution of Higher Order Ambisonics

A general plane wave function x(t) arriving from a direction $\Omega_0=(\theta_0,\phi_0)^T$ is represented in HOA by $$d_n^m(t)=x(t)S_n^m(\Omega_0), 0\leq n\leq N, |m|\leq n. \quad (46)$$

The corresponding spatial density of plane wave amplitudes d(t, Ω): $=\mathcal{F}_t^{-1}(D(\omega,\Omega))$ is given by $$d(t,\Omega)=\sum_{n=0}^{N}\sum_{m=-n}^{n}d_n^m(t)S_n^m(\Omega) \quad (47)$$

$$=x(t)\underbrace{\left[\sum_{n=0}^{N}\sum_{m=-n}^{n}S_n^m(\Omega_0)S_n^m(\Omega)\right]}_{v_N(\Theta)}. \quad (48)$$

It can be seen from equation (48) that it is a product of the general plane wave function x(t) and a spatial dispersion function $v_N(\Theta)$, which can be shown to only depend on the angle $\Theta$ between $\Omega$ and $\Omega_0$ having the property $$\cos\Theta=\cos\theta\cos\theta_0+\cos(\phi-\phi_0)\sin\theta\sin\theta_0. \quad (49)$$

As expected, in the limit of an infinite order, i.e. $N\to\infty$, the spatial dispersion function turns into a Dirac delta $\delta(\cdot)$, $$\text{i.e. } \lim_{N\to\infty} v_N(\Theta)=\frac{\delta(\Theta)}{2\pi}.$$

(50)

Figure 6:
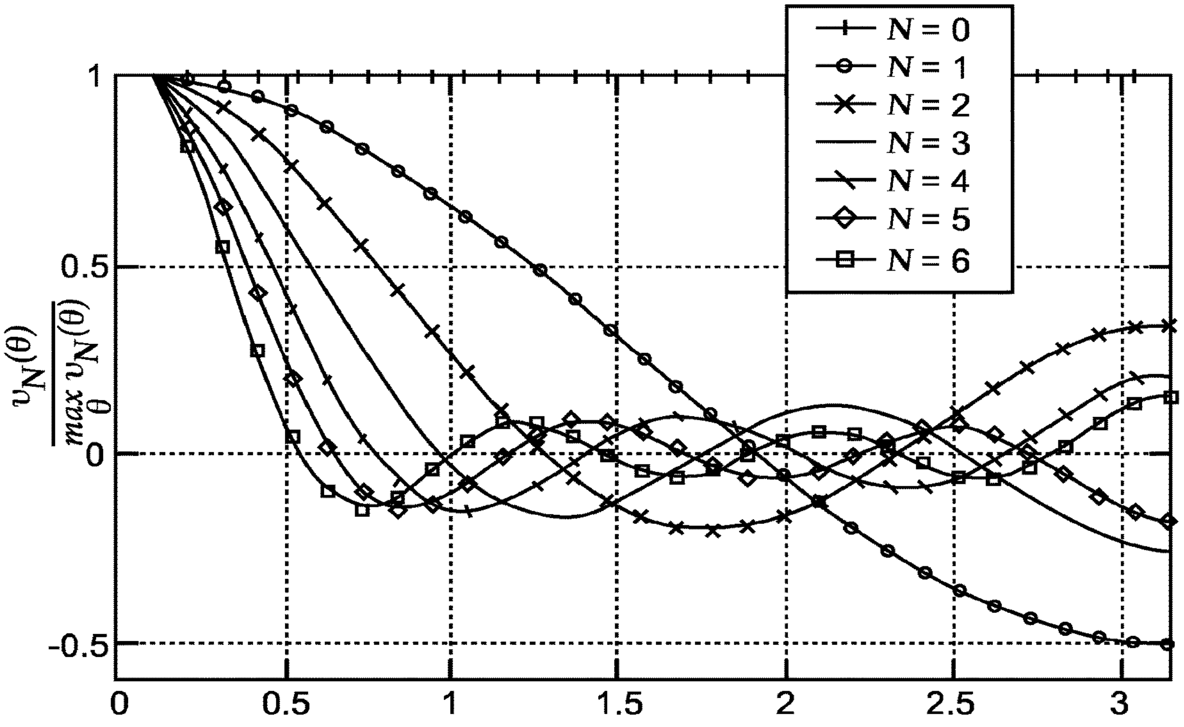
FIG. 6 illustrates an exemplary plot of a normalised function $v_N(\Theta)$ for different values of N.

However, in the case of a finite order N, the contribution of the general plane wave from direction $\Omega_0$ is smeared to neighbouring directions, where the extent of the blurring decreases with an increasing order. A plot of the normalised function $v_N(\Theta)$ for different values of N is shown in FIG. 6.

It is pointed out that any direction $\Omega$ of the time domain behaviour of the spatial density of plane wave amplitudes is a multiple of its behaviour at any other direction. In particular, the functions d(t, $\Omega_1$) and d(t, $\Omega_2$) for some fixed directions $\Omega_1$ and $\Omega_2$ are highly correlated with each other with respect to time t.

Discrete Spatial Domain

If the spatial density of plane wave amplitudes is discretised at a number of O spatial directions $\Omega_o$, $1\le o\le O$, which are nearly uniformly distributed on the unit sphere, O directional signals d(t, $\Omega_o$) are obtained. Collecting these signals into a vector $$d_{SPAT}(t):=[d(t,\Omega_1)\ldots d(t,\Omega_O)]^T, \quad (51)$$

it can be verified by using equation (47) that this vector can be computed from the continuous Ambisonics representation d(t) defined in equation (41) by a simple matrix multiplication as $$d_{SPAT}(t)=\Psi^H d(t), \quad (52)$$

where $(\cdot)^H$ indicates the joint transposition and conjugation, and $\Psi$ denotes the mode-matrix defined by $$\Psi:=[S_1\ldots S_O] \quad (53)$$

with $$S_o:=[S_0^0(\Omega_o)S_1^{-1}(\Omega_o)S_1^0(\Omega_o)S_1^1(\Omega_o)\ldots S_N^{N-1}(\Omega_o)S_N^N(\Omega_o)]. \quad (54)$$

Because the directions $\Omega_o$ are nearly uniformly distributed on the unit sphere, the mode matrix is invertible in general. Hence, the continuous Ambisonics representation can be computed from the directional signals d(t, $\Omega_o$) by $$d(t)=\Psi^{-H}d_{SPAT}(t). \quad (55)$$

Both equations constitute a transform and an inverse transform between the Ambisonics representation and the spatial domain. In this application these transforms are called the Spherical Harmonic Transform and the inverse Spherical Harmonic Transform. Because the directions $\Omega_o$ are nearly uniformly distributed on the unit sphere, $\Psi^H\approx\Psi^{-1}$, (56) which justifies the use of $\Psi^{-1}$ instead of $\Psi^H$ in equation (52). Advantageously, all mentioned relations are valid for the discrete-time domain, too.

At encoding side as well as at decoding side the inventive processing can be carried out by a single processor or electronic circuit, or by several processors or electronic circuits operating in parallel and/or operating on different parts of the inventive processing.

The invention can be applied for processing corresponding sound signals which can be rendered or played on a loudspeaker arrangement in a home environment or on a loudspeaker arrangement in a cinema.

The invention claimed is:

1. A method for decompressing a compressed Higher Order Ambisonics (HOA) representation, the method comprising:

perceptually decoding the compressed HOA representation to determine decompressed dominant directional signals and decompressed time domain signals representing residual HOA component in a spatial domain, wherein the decompressed time domain signals correspond to a reduced order residual HOA component;

determining predicted directional signals based on the decompressed dominant directional signals, wherein the predicted directional signals are determined based on a smoothing using a windowing function;

determining a decompressed residual HOA component based on the decompressed time domain signals, wherein the decompressed HOA component is based on extending an order of the reduced order residual HOA component, and wherein the extending comprises appending zero values to the reduced order residual HOA component;

determining an HOA sound field representation based on the predicted directional signals and the decompressed residual HOA component; and outputting the HOA sound field representation for rendering to loudspeaker feeds.

2. A non-transitory computer readable medium containing instructions that, when executed, perform the steps of the method of claim 1.

3. An apparatus for decompressing a Higher Order Ambisonics (HOA) representation, the apparatus comprising:

a decoder for perceptually decoding the compressed HOA representation to determine decompressed dominant directional signals and decompressed time domain signals representing residual HOA component in a spatial domain, wherein the decompressed time domain signals correspond to a reduced order residual HOA component; and a first processor for determining predicted directional signals based on the decompressed dominant directional signals, wherein the first processor is configured to determine the predicted directional signals based on a smoothing using a windowing function;

a second processor for determining a decompressed residual HOA component based on the decompressed time domain signals, wherein the decompressed HOA component is based on extending an order of the reduced order residual HOA component, and wherein the extending comprises appending zero values to the reduced order residual HOA component;

a third processor for determining an HOA sound field representation based on the predicted directional signals and the decompressed residual HOA component; and a further processor for outputting the HOA sound field representation for rendering to loudspeaker feeds.

* * * * *